United States Patent [19]

Bikson et al.

[11] Patent Number: 4,881,955
[45] Date of Patent: Nov. 21, 1989

[54] METHOD FOR GAS SEPARATION USING HELICALLY WOUND HOLLOW FIBERS PERMEABLE MEMBRANE CARTRIDGE

[75] Inventors: Benjamin Bikson, Brookline; Salvatore Giglia, Norwood, both of Mass.

[73] Assignee: Union Carbide Corporation, Danbury, Conn.

[21] Appl. No.: 242,602

[22] Filed: Sep. 12, 1988

[51] Int. Cl.⁴ .............................. B01D 53/22
[52] U.S. Cl. ............................ 55/16; 55/68
[58] Field of Search .................. 55/16, 68, 158; 210/500.23

[56] References Cited

U.S. PATENT DOCUMENTS

| | | | |
|---|---|---|---|
| 3,339,341 | 9/1967 | Maxwell et al. | 55/158 X |
| 3,422,008 | 1/1969 | McLain | 210/22 |
| 3,442,002 | 5/1969 | Geary, Jr. et al. | 29/450 |
| 3,794,468 | 2/1974 | Leonard | 23/258.5 |
| 3,884,814 | 5/1975 | Vogt et al. | 55/158 X |
| 4,045,851 | 9/1977 | Ashare et al. | 210/500.23 X |
| 4,207,192 | 6/1980 | Coplan et al. | 55/158 X |
| 4,336,138 | 6/1982 | Taniyama et al. | 55/158 X |
| 4,368,124 | 1/1983 | Brumfield | 210/500.23 X |
| 4,380,460 | 4/1983 | Otstot et al. | 55/158 |
| 4,430,219 | 2/1984 | Kuzumoto et al. | 210/321.3 |
| 4,623,460 | 1/1986 | Kuzumoto et al. | 210/321.1 |
| 4,631,128 | 12/1986 | Coplan et al. | 210/321.5 |
| 4,734,106 | 3/1988 | Gollan | 55/16 |

FOREIGN PATENT DOCUMENTS 2022457 12/1979 United Kingdom .
2122103 1/1984 United Kingdom .

OTHER PUBLICATIONS

Antonson et al., Ind. Eng. Chem., Proc. Des. Dev. 16, 463, (1977), "Analysis of Gas Separation by Permeation in Hollow Fibers".

Primary Examiner—Robert Spitzer
Attorney, Agent, or Firm—Alvin H. Fritschler

[57] ABSTRACT

Feed gas is introduced into the bores of a helically wound hollow fiber membrane cartridge containing hollow fibers of essentially uniform active lengths. Permeate gas flow is maintained countercurrent to the feed and raffinate gas entrance and exit axis, respectively, while the directional flow axis of permeate withdrawal can be at a substantial angle to the helically wound hollow fiber membrane surface. Complete radial mixing of the permeate stream on the outer, permeate side and essentially no axial mixing on either the permeate or the raffinate side of the hollow fiber membrane cartridge are maintained.

11 Claims, No Drawings

METHOD FOR GAS SEPARATION USING HELICALLY WOUND HOLLOW FIBERS PERMEABLE MEMBRANE CARTRIDGE

FIELD OF THE INVENTION

This invention relates to an improved hollow fiber membrane cartridge and to its use in an improved process for the separation of gases by permeation. The invention concerns use of helically wound hollow fiber permeator cartridges in which the active lengths of the hollow fibers used in their construction are essentially uniform throughout the permeator cartridge. In the gas separation process the mixture of gases is fed into the bores of the hollow fibers and the flow of the permeate stream is preferably maintained in countercurrent flow to the flow of the raffinate stream exiting the bores of the hollow fibers during the gas separation process. During the gas separation process substantial radial mixing of the permeate stream on the permeate side and the feed stream on the feed stream side take place, while essentially no axial mixing on either the permeate side or the feed side of the hollow fiber permeable membrane cartridge takes place.

BACKGROUND

Permeable membranes capable of selectivity permeating a component are well known in the art and are considered advantageous means of separation in certain fluid separation applications with hollow fiber membrane geometry frequently considered the most advantageous arrangement. The construction and use of helically wound hollow fiber permeable membrane cartridges and modules incorporating said cartridges is well known in the art, also known are those cartridges wherein the hollow fibers are present in a parallel configuration, both crimped and not crimped, rather than a helical configuration, as evidenced by the prior art discussed below. The products and process of this invention are concerned with helically wound hollow fibers permeable membrane cartridges.

In practice, hollow fiber permeable membrane cartridges are constructed with both bore side feed or shell side feed configurations. This invention is concerned solely with use of bore side feed permeators in which the feed mixture is initially contacted with the inside surface or interior bore of the hollow fiber with the permeate stream recovered from the outside surface of the hollow fiber and the raffinate stream recovered from the opposite ends of the bores of the hollow fibers under the specific conditions hereinafter defined. Furthermore, this invention is concerned primarily with gas separation applications in which at least one more permeable component is separated from a mixture of gases by a permeation process through a hollow fiber membrane.

The importance of accomplishing optimal flow dynamic conditions in membrane separation applications is well recognized in the field and consequently the importance of design and construction aspects of hollow fiber permeators to accomplish these optimal flow dynamic conditions are of significant consideration. For example, in "Analysis of Gas Separation by Permeation in Hollow Fibers", C. R. Antonson et al., Ind. Eng. Chem., Proc. Des. Dev., 16, No. 4, 463–469 (1977), the use of hollow fibers for gas separation by permeation was studied in considerable detail. The entire study appears to have been made with hollow fibers in parallel arrangement, there being no indication of the use of helically wound units in the article. Among the conditions studied was the effect of flow pattern, with six flow patterns considered. FIG. 6 and the discussion on pages 466 and 467 report their findings on this aspect of their study. In general, the authors found bore feed flow patterns better than shell feed flow patterns, with bore feed, countercurrent-flow having the highest enrichment ratio and the highest fast gas recovery. The article indicates that to accomplish optimal separation conditions no gas mixing should take place in the axial direction on both the feed and permeate sides of the membrane.

U.S. Pat. No. 3,442,002, issued on May 6, 1969 to J. E. Geary, Jr., et al., discloses a fluid separation apparatus that employs bundles of hollow filaments with the fibers in each bundle in substantially parallel alignment. The patent discloses both introducing the initial mixture through the interior of the hollow filaments and introducing it to the outside of the hollow filaments, but the patent is concerned primarily with liquid separations and does not address the optimal countercurrent gas separation conditions.

Otstot et al., in U.S. Pat. No. 4,380,460 issued on Apr. 19, 1983, relates to a permeator cell in which the hollow fibers are in parallel alignment extending the length of the shell of the encasing vessel. The patent is primarily concerned with the use of a slit tube to protect the hollow fibers while being inserted into the shell. Nowhere is there any mention of helical winding, or of the importance of controlling radial mixing and axial mixing of the permeate and raffinate streams.

In U.S. Pat. No. 4,430,219, issued to Kuzumoto et al. on Feb. 7, 1984, bundles of hollow fibers are helically wound in nearly parallel relation to one another and the unit is then used in fluid separation processes. However, no attempt is made to maintain an essentially uniform hollow fiber length throughout the unit; the patent does not describe or recognize the applicability of helically wound arrangement in countercurrent gas separation applications. Further, nowhere in this published patent is there any recognition of the importance of essentially complete radial mixing of the permeate stream on the permeate side and essentially no axial mixing on either the permeate side or raffinate side of the wound permeation unit.

In U.S. Pat. No. 4,623,460, issued to Kuzumoto et al., on Nov. 18, 1986, a fluid separation unit is disclosed wherein the hollow fibers are in parallel alignment; a bundle of hollow fibers is formed in U-letter shape, potted at both ends and encased in a shell. The reference does not use a helically wound unit even though the hollow fibers may have essentially uniform length. In addition, the patentees introduce the fluid to be treated to the exterior surface of the hollow fibers not through the bores.

In U.S. Pat. No. 3,422,008, issued on Jan. 14, 1969 to E. A. McLain, permeator cartridges, generally for liquid separations, are produced by spiral winding hollow fibers around a mandrel using a pitch of at least 10° and preferably 30°. No attempt is made to produce a cell with essentially all of the hollow fibers having an essentially uniform length. The patent is primarily concerned with liquid separation applications and does not disclose introducing the feed through the bores or interior of the hollow fibers and also discloses shell side feed on the shell side or exterior of the fibers. The patentee also states it is generally preferable to have shell side feed to the outside of the hollow fiber and recover the permeate from the bores or the inside of the hollow fiber (column 13, lines 14 to 19). There is no disclosure of a gas separation process with countercurrent flow configuration and there is no recognition of the importance of control of radial mixing and axial mixing in such a process.

The mass transfer device used in the processes disclosed in U.S. Pat. No. 3,794,468, issued on Feb. 26, 1974 to R. J. Leonard, is of helical construction. However, in the process a first fluid is passed through the interior of the bores of the hollow fibers and a second fluid is passed around the exterior surface of the hollow fibers. A mass transfer occurs between the two fluids, as in the processes for oxygenating blood or in kidney dialysis. The process described does not necessarily provide for essentially uniform hollow fiber length or contain any recognition of gas separation applications with countercurrent flow conditions and the importance of control of radial mixing and axial mixing in permeation separation processes.

U.S. Pat. No. 4,631,128, issued to Coplan et al. on Dec. 23, 1986, discloses one of the methods for producing permeator cells in which the hollow fibers have essentially uniform length. However, this reference nowhere suggests or discloses that unexpected and unpredictable results can be achieved under the specifically described conditions of this instant invention. The Coplan et al. patent does not suggest, disclose, or recognize the importance of bore side feed while maintaining essentially complete radial mixing and essentially no axial mixing on either the permeate side or the feed side.

U.S. Pat. No. 4,734,106, issued to A. Golan, and U.K. patent applications, publication Nos. 2,122,103A and 2,022,457A, describe countercurrent gas separation with hollow fiber modules wherein hollow fibers employed are asymmetric or composite with separation layers being on the outside of the hollow fiber and with the feed gas being introduced through the hollow fiber bores with the feed permeate flown tangentially along the fiber with hollow fiber, arranged in cylindrical bundle of parallel contiguous hollow fibers. Nowhere is there any mention of the possibility of using helical winding for module construction in these publications and the surprising aspect of countercurrent flow conditions accomplished under permeate flow conditions different than tangential flow with respect to membrane surface.

None of the references recognize, suggest or disclose the importance of using a helically wound hollow fiber permeable membrane cartridge in which essentially all of the hollow fibers are of uniform length in a process for separating a fast gas stream or a component stream at enhanced permeation rate that entails bore side feeding the gas containing mixture at a positive pressure into the interior at the inlet end of the bores of the hollow fibers, removing a fast gas permeate stream from the exterior surface or shell side of the hollow fibers in a permeate flow direction that is in countercurrent flow to the feed flow direction, removing a raffinate stream at the opposite exit end of the bores of the hollow fibers in a raffinate flow direction that is in cocurrent flow to the feed flow direction while simultaneously maintaining essentially complete radial mixing of the permeate stream on the permeate side and essentially no axial mixing of either the permeate side or the raffinate side.

SUMMARY OF THE INVENTION

A fluid gas separation process that provides high separation efficiency is disclosed for separating at least one more permeable component from a mixture of components. The process generally results in high separation efficiency or in higher productivity at a given purity compared with processes that utilize modules of conventional design known in the art. In the process of this invention the fluid gas feed mixture is fed into a first inlet end, the bores of the hollow fibers of a helically wound hollow fiber permeable membrane cartridge at a positive pressure; the hollow fiber permeable membrane cartridge being located in a vessel with suitable inlet means and exit means for the feed mixture, the fast gas permeate stream and the raffinate stream, and means for controlling pressure, temperature and flows. The overall direction of withdrawal of the fast gas permeate stream flow in the module is maintained in a direction that is countercurrent to the direction of the axis formed by the feed and raffinate entrance/exit ports, while the flow of the fluid gas feed mixture in the fiber bores can actually be at a substantial angle to the permeate stream flow direction. The permeate flow in the module is also at a substantial angle to the membrane surface and not tangential. The raffinate stream is recovered at the exit end of the bores of the hollow fibers opposite the fluid gas feed first inlet end of the bores and the flow of the raffinate stream in the module. It was found, surprisingly that during the above gas separation process essentially complete or significant radial mixing of the permeate stream on the permeate side and essentially no axial mixing on either the permeate side or the raffinate side of the hollow fibers permeable membrane cartridge are maintained. The active lengths of essentially all of the hollow fibers used to construct the permeable membrane cartridge are essentially uniform throughout its construction.

DESCRIPTION OF THE INVENTION

In the improved bore side fluid gas separation process of this invention it was found unexpectedly that in helically wound permeators countercurrent flow conditions are maintained; there is practically no axial mixing and there is a high level of radial mixing. The result is a separation cartridge with almost ideal flow dynamics and separation characteristics. It was also found that the purity of fast component was unexpectedly enhanced compared to cartridges constructed in the conventional manner. The enhanced performance was achieved when the separation operation was conducted under certain operating conditions with the use of helically wound hollow fiber permeable membrane cartridges of particular construction in a permeator module. The main requirement for hollow fibers to be used in the process of this invention is the ability to separate at least one more permeable component from a gas stream. Porous, dense wall, asymmetric, or composite hollow fiber with a separating barrier on either side of the fiber wall can be utilized. The hollow fibers in the helically wound hollow fiber permeable membrane cartridge have to be of essentially uniform length throughout said cartridge. This hollow fiber permeable membrane cartridge is then housed in a module; the module is equipped with suitable inlet means and exit means for the feed mixture, for the permeate fast gas component stream and means for controlling pressure, temperature and flows are incorporated into the system. The structure and construction of fluid gas permeator modules is well known to those of ordinary skill in the art and needs no further description herein for an understanding of the different known configurations.

In the improved process of this invention bore side feed is used and the fluid gas mixture is fed into the inlet end of the bores of the helically wound hollow fiber permeable membrane cartridge at a positive pressure. The permeate stream component is removed from the shell side of the cartridge housed in the module, and the permeate flow direction is countercurrent to the fluid feed mixture entering the bores and countercurrent to the flow of raffinate exiting the bores. The product purity or product recovery is usually adjusted by maintaining a particular process stage cut. The module is encased in a housing and provides for a fluid tight o-ring seal against each tubesheet. The feed gas enters the bore side of the hollow fiber at the hollow fiber bore openings in the tubesheet. The feed side gas flows along through the length of the hollow fiber as the permeate gas (enriched in the faster permeating gas) passes through the wall of the fiber and exits the module. The retentate gas (stripped of the faster permeating gas) exits at the end opposite to the feed gas entrance.

An impermeable barrier (an impervious film, such as polyvinylidene chloride, for example) surrounding the cartridge with an opening in the barrier next to the feed inlet tubesheet forces the permeate gas to flow countercurrent to the bulk flow direction of the feed side gas. The flow pattern can be changed to cocurrent by simply reversing the flow by entering the feed gas where the retentate is recovered and recovering the retentate where the feed gas enters. Note that the permeate outlet port can be located anywhere along the length of the housing (permeate side) without affecting the feed-/permeate flow pattern since an annular space allows the gas to flow outside of the fiber cartridge. This annular space may not always be necessary, for example, when the fiber cartridge is pressed against the walls of the housing. In this case, the permeate outlet port should be located adjacent to one of the tubesheets to provide for countercurrent or cocurrent flow.

The separation process can be carried out by introducing the feed gas at above atmospheric pressure and withdrawing permeate at reduce pressure, alternatively the permeate can be withdrawn under vacuum conditions. During the gas separation process essentially complete radial mixing of the fast gas permeate stream on the permeate side of the hollow fiber permeable membrane cartridge and essentially no axial mixing on either the permeate side or the raffinate side of the hollow fiber permeable membrane cartridge takes place. In several specific cases, the complete radial mixing might not be attainable particularly if hollow fiber membranes with high permeation rates are utilized. However, the process of this invention is still expected to provide gas separation performance superior to conventional designs. It has been observed that in general the process of this invention results in an enhanced fast gas permeation rate and the purity of the fast gas in the permeate stream is enhanced compared to gas separation processes that utilize the different modules known in the art. This is particularly true for the enrichment of nitrogen from air. The process of this invention also results in improved uniform gas flows, thus avoiding channeling or by-passing of the membrane that leads to reduction of separation efficiency a condition often experienced in modules previously constructed by known procedures.

It is well recognized in the field that flow dynamics in a membrane module is very important in final module performance. It is further recognized that countercurrent flow represents the optimal flow arrangement for most gas separation applications, with cocurrent flow being optimal for a limited number of gas separation applications. In countercurrent flow arrangement, feed is introduced and flows along the membrane surface with raffinate withdrawn at the membrane module end, while the permeate, enriched with at least one more permeable as component, flows countercurrently to the feed/raffinate flow direction. To accomplish a countercurrent flow arrangement in hollow fiber module permeators, hollow fibers are typically arranged in a parallel fashion with feed gas flown tangentially along and outside the hollow fibers with permeate withdrawn from the hollow fiber bores in a countercurrent flow arrangement. Alternatively, the feed gas is introduced into hollow fiber bores with permeate withdrawn on the shell side in countercurrent flow arrangement with permeate flow tangential to the membrane surface. It is generally recognized that the countercurrent flow arrangement represents ideal flow configuration and any maldistribution in flow pattern, for example, due to nonuniformity of flow through the cartridge, such as flow channeling, will dramatically decrease module performance. Generally an arrangement of fibers in parallel to the feed/raffinate/permeate direction has been considered essential in the field to accomplish countercurrent flow conditions.

It was found, surprisingly, by us that hollow fiber modules can be constructed with helically wound hollow fiber membranes and operated with gas feed introduced into the hollow fiber bores with countercurrent flow conditions being fully attained, with the fiber in the module being arranged not tangential but at a substantial angle and occasionally almost perpendicular to the permeate flow direction.

Throughout this patent application the following terms, or variants thereof, have the meanings indicated below in describing this invention. The term "essentially all of uniform length" means that the active lengths of the hollow fibers of the permeator cell will vary from one another by less than about 20 percent, preferably less than about 10 percent. The term "hollow fiber permeable membrane cartridge" means a helically wound unit of a hollow fiber permeable membrane wherein essentially all of the hollow fibers in the unit are of uniform length; such units can be constructed by known means, e.g., the helical winding process shown in U.S. Pat. No. 4,631,128. The term "permeator module" means a unit comprising hollow fiber permeable membrane cartridge and a housing or vessel, the unit being equipped with all the required equipment means, valves, and openings for feeding a fluid gas mixture and the recovery of permeate and raffinate. The mechanical construction of a module is known to one of ordinary skill in the art and is fully described in the published literature, e.g., U.S. Pat. No. 4,207,192.

The term "wind angle" is defined as follows: With a bundle in the horizontal position, the wind angle X is defined as the angle at which the fiber is laid across the bundle with respect to the vertical axis. Fibers wound at a 90° wind angle, for example, would be parallel and straight from end to end on the bundle. Fibers wound in a module at the same wind angle will have the same fiber length. The term "radial mixing" is defined as follows: The permeate/feed gas in a hollow fiber module is considered perfectly radially mixed if the gas composition in a cross-sectional area which is perpendicular to the bulk flow direction of the permeate/feed gas is uniform and homogeneous. Note that the permeate radial mixing is not necessarily perpendicular to the wall of the fiber. If the fiber in a module is wound at a 45° wind angle, then the gas on the shell side of the fiber, (the permeate gas in the case of the bore side feed), is radially mixed at a 45° angle with respect to the fiber. At the same time no mixing in the axial direction should take place. Without permeate side radial mixing, a crossflow-type permeation will result regardless of the feed and bulk permeate flow pattern. For most applications, a countercurrent, (and in a few cases cocurrent), permeation is more efficient than crossflow permeation. Thus a radially mixed permeate gas is almost always desirable.

The term "axial mixing" means mixing along the direction of flow. This is essentially parallel to the fiber direction for the feed gas and for the permeate flow parallel to the axis that follows the feed gas entrance and raffinate exit ports. By "channeling" is meant the by-passing of a particular section of the membrane surface by the fluid, i.e., the fluid flows through the permeator module in a non-uniform flow giving rise to instances of high or low linear velocities and causing diminished module performance by reducing separation efficiency. The term "stage cut" means amount, in percent, of permeate gas originally present in the fluid feed mixture that is permitted to permeate through the permeable membrane.

The term "component", alone or as in the term "permeate stream component" or in combination with other words referring to a gas or gas mixture, means an individual gas or compound that was originally present in the feed mixtures or a mixture of gases or compounds in which one or more of the gases or compounds originally present in the feed mixture is decreased in concentration in the raffinate stream. As is known, in most permeation separation processes one obtains enrichment, not complete separation. The instant invention provides significant and unexpected improvements in component permeate rate and enrichment of component purity.

Though the separation of a gas or compound by feeding a mixture of gases to either the shell side of a hollow fiber permeator module to bring initial contact of the feed gas to the exterior surface of the hollow fibers, or to the bore side of the hollow fibers to bring initial contact of the feed gas to the interior surface of the bores of the hollow fibers, are both known, many efforts are still being made to improve these techniques. The process of this invention is one which results in unexpected and unpredictable increase in overall separation characteristics.

The pressure of the fluid gas feed can be from about 50 psig or less to about 400 psig or higher, preferably from about 100 psig to about 200 psig. As is known, the most preferred pressure conditions for a specific instance will depend upon many variables, including the composition of the feed, the hollow fibers employed, the permeable material characteristics of the hollow fiber, the size of the cartridge and the permeator module, the temperature, etc., and it is readily established by known engineering calculation procedures. The pressure differential utilized in the process should not exceed, however, the burst pressure of the hollow fiber membrane or the pressures that can decrease the separation characteristics of the membrane through defect formation.

An important feature of the instant invention is the use of a helically wound hollow fiber permeable membrane cartridge rather than a parallel cell. The use of the helically wound hollow fiber permeable membrane cartridge enhances fast gas permeation rate, uniform distribution, minimizes chanelling, provides better flow dynamics, and results in better separation with higher purity at a given stage cut or higher recovery at a given purity. In this separation process there is essentially complete radial mixing of the permeate stream on the permeate side of the hollow fiber permeable membrane cartridge and essentially no axial mixing on either the permeate side or the raffinate side of the hollow fiber permeable membrane cartridge. For economic reasons, in a commercial gas separation process one requires not only good selectivity but high production rate and product purity, the permeation rate being an indication of production rate. If one has good selectivity and a low rate, the economic viability of the process is highly questionable, the same is true if one has poor selectivity and a high rate. The process of this invention enables the attainment of good selectivity, enhanced fast gas permeation rate, and enhanced product purity in a manner that was not predictable.

In a typical embodiment of the process of this invention nitrogen is recovered at good productivity and enhanced purity by feeding air at 100 psig into the bores of a composite membrane prepared by coating porous polysulfone hollow fibers with ethyl cellulose, wound into a cartridge and housed in a vessel. The permeator module was constructed to permit recovery of the permeate stream from exit means located at the same end of the module structure in which the air feed was introduced into the permeate module, thus maintaining a countercurrent flow between oxygen enriched permeate flow in the exterior permeate side of said cartridge and air fed into the bores of the coated porous polysulfone hollow fiber permeate cartridge and recovering the raffinate stream from the end of the module structure opposite the end in which the air feed was introduced into the module.

Helically wound porous hollow fiber permeable membrane cartridges useful in the process of this invention are prepared by known conventional procedures used by those skilled in the art, with the necessary steps being taken during production to assure that essentially all of the hollow fibers in the permeator cell are essentially of uniform length. The lengths of hollow fibers should vary from one another by less than about 15% to about 20%, preferably less than about 5% to about 10%. Surprisingly, a broad range of winding angles can be utilized without adversely affecting the flow dynamics in the module. However, very low angles can result in high hollow fiber lengths and this can lead to an excessive pressure drop in the module. The pressure drops are easily calculated by known engineering formulas and hollow fibers are wound at angles not to exceed desirable levels of pressure drops. The preparation of these hollow fiber permeable membrane cartridges is not the gist of this invention and any procedure for their production can be used, a particularly appropriate method being fully described in U.S. Pat. No. 4,207,192; the helically wound porous hollow fiber permeable membrane cartridge is then housed in a vessel to form the permeator module. The permeator module is constructed in such manner that the fluid gas feed feeds at a positive pressure into a first end of said module into the bores at the inlet ends of the hollow fibers, fast gas component permeates through the walls of the permeable porous hollow fibers and flows into the space between the exterior surface of the hollow fibers. The hollow fibers can be composite, porous, asymmetric or dense (non-porous) and the thin separation skin can be on the outside or on the inside wall of the hollow fiber. The permeate stream is recovered by permeate recovery means situated near said first end of said module, non-permeated gas or raffinate stream continues to flow through the bores of the hollow fibers of said cartridge exiting through the second end of said module situated opposite said first end. During the gas permeation separation process the permeate stream flow is in countercurrent flow to the feed stream flow entering the hollow fibers and the raffinate stream exiting the hollow fibers, and essentially complete radial mixing of the permeate stream on the permeate side of the permeator cell and essentially no axial mixing on either the permeate side or the raffinate side of the permeator cell takes place. In a limited number of cases cocurrent flow may be a more desirable mode of operation. In such cases the permeate exit port is constructed to allow cocurrent flow condition; however, generally countercurrent flow is preferred.

The production of permeable hollow fibers and the materials used for their production are well known. Such hollow fibers are readily produced by the procedure described by I. Cabasso, "Hollow Fiber Membranes", Kirk Othmer: Enc. of Chem. Tech., 12, Third Ed., 492–517 (1980) and I. Cabasso, "Membranes", Enc. of Pol. Sc. & Eng., 9, Second Ed., 509–579 (1987), incorporated herein by reference.

Advantageously the walls of the hollow fibers are sufficiently thick so that no special apparatus would be required for their handling and they can be conveniently wound into cartridges. The outside diameter of the hollow fiber can vary from about 1 mil or less to about 100 mils or more, preferably from about 2 mil to about 80 mils. The wall thickness of the hollow fiber can vary from about 0.1 mil to about 12 mils or more, preferably at least about 0.2 mil up to about 20 mils.

In order to provide a desirable flux, the walls of the asymmetric, composite and porous hollow fibers are made to contain substantial void volume, particularly those hollow fibers having walls at least about 2 mils in thickness. Voids are regions within the hollow fibers which are vacant of the material of the hollow fibers. Thus, when voids are present the density of the hollow fiber is less than the density of the bulk material of the hollow fiber. The void volume of the hollow fiber can be as high as 90 percent, or from about 10 percent to 80 percent, and sometimes about 20 to 70 percent, based on the superficial volume," i.e., the volume contained within the gross dimensions of the hollow fiber, excluding the bore volume.

In many instances the porous hollow fiber is coated with a coating material and is in the form of a composite membrane with a thin membrane-forming material applied to the surface of the porous hollow fiber. This can be produced by any of the known procedures, e.g., as shown in U.S. Pat. No. 4,467,001, wherein a solution of the membrane-forming material is applied to deposit a finished dry coating up to about 7,000 Angstroms, preferably from about 500 to about 2,000 Angstroms, adhered to the exterior surface of the porous hollow fiber. In some instances adhesion of the membrane-forming material to the surface of the porous hollow fiber is promoted by coupling agents and/or chemical treatment.

Tubesheets comprise the end portions of the bundle of hollow fibers embedded in a solid potting material. The formation of the tubesheet can be carried out in any suitable manner and such procedures are well known in the art, e.g., U.S. Pat. Nos. 3,339,341, 3,442,389, 3,455,460, 3,690,465 and 4,207,192, all of which are incorporated herein by reference. Generally the potting material is in liquid form when preparing the tubesheet and solidifies to a pressure resistant, leak-free structure.

The potting material can be inorganic or organic or a mixture thereof. The organic resins that solidify on cooling or curing are generally employed, particularly those which will form a strong adhesive bond to the exterior walls of the permeable hollow fibers and exhibit little shrinkage. These materials are well known and fully described in the literature, e.g., U.S. Pat. No. 4,369,605, incorporated herein by reference. The tubesheets are secured by conventional techniques to expose and fully open the hollow fiber ends in the cartridge to allow unrestricted entrance of the feed stream and exit of the raffinate stream.

For convenience of description polysulfone porous hollow fibers are generally used to further describe the invention. However, the invention is not restricted to such fibers only.

The porous polysulfone hollow fibers used in the example were spun from a ternary solution of polysulfone, in a solvent/non-solvent mixture well known in the art following the procedures described by Cabasso et al. in "Composite Hollow fiber Membranes", Journal of Applied Polymer Science, Vol. 23, pages 1509-1523. The well known tube-in-tube jet technique was used in the spinning procedure, with water at about 21° C. being the outside quench medium for the fibers. The quench medium in the center bore of the fiber was air. Quenching was followed by washing the fibers with water. Following the wash, the hollow fibers were dried at 30° C. by passage through a hot air drying column. The dried hollow fiber was immediately in-line coated with an ethyl cellulose polymer solution. The ethyl cellulose polymer solution was prepared by dissolving about one percent ethyl cellulose in isopropanol and then filtering through a 1.5 millimicron glass filter prior to application to the polysulfone. The dried hollow fiber was passed through the filtered coating solution contained in a coating vessel and the coated fiber was then dried in an air oven prior to being taken up on a winder. The resulting polysulfone hollow fiber composite membrane had an ethyl cellulose membrane material coating thickness of about 0.2 micron. The thus prepared composite membranes had a separation factor of 3.85 between oxygen and nitrogen and permeability of about 0.65 $ft^3/ft^2.psi.day$. These hollow fibers were used to construct the permeator cartridges.

Hollow fiber permeable membrane cartridges of helical wind configuration about 2 inches in diameter and about 9 inches long exclusive of tubesheet were prepared by the procedure described in U.S. Pat. No. 4,207,192. In said cartridges the wind angle of each cartridge was varied and was 17°, 25° and 33°. Essentially all of the hollow fibers in a specified helically wound hollow fiber permeable membrane cartridge were essentially of uniform length. Both ends of said cartridges were embedded in an epoxy resin tubesheet by conventional procedures known to those skilled in the art.

For comparative purposes a straight parallel configuration permeator cartridge about one inch in diameter and about 12 inches long was prepared with both ends embedded in an epoxy resin tube sheet by conventional procedures. The active length after severing the tube sheet was about 9 inches, identical to the length of the helically wound cartridges.

Permeator modules were prepared with both helically wound and parallel fiber permeator cartridges. These were constructed to introduce the gas mixture into one end of the module shell and into the bores of the hollow fibers for bore side feed of the gas mixture into the permeator cartridge. The raffinate stream exited from the opposite end of the bores and was removed from the other end of the permeator module. The permeate stream component that permeated through the walls of the hollow fibers was recovered by means situated on the side wall of the permeator module shell. In constructing permeator module adequate seals are provided to separate feed stream and raffinate stream from permeate stream.

Each module was tested for air separation at a number of stage cuts between 9% and 90% at 23° C. The bore side feed pressure was 115 psia and the permeate component outlet pressure was maintained at 16 psia (atmospheric pressure).

The following examples serve to further illustrate this invention.

EXAMPLE 1

Run A

In this example a helically wound (33° wind angle) cartridge having a membrane area of 25 square feet constructed from polysulfone hollow fibers coated with ethyl cellulose was used to recover an enhanced purity nitrogen component stream from air at 115 psia by the procedure described above. Essentially all of the hollow fibers in the cartridge were of uniform length and did not vary in length by more than about eight percent. The permeator cartridge was used to construct a permeator module for bore side feed of the air, shell side recovery of the oxygen permeate component, and recovery of enhanced purity nitrogen component raffinate stream from the other end of the cartridge unit. The shell of the module housing was provided with means to recover permeate component either by countercurrent flow to the feed flow or cocurrent flow to the feed flow.

In this run, the oxygen permeate component was shell side recovered in countercurrent flow to the air feed flow and nitrogen raffinate component was recovered from the bores at the opposite end of the bore side feed inlet. The raffinate stream showed enhanced nitrogen purity and the permeate stream showed enhanced oxygen purity when operating in accord with this invention. The data in Table I summarize the nitrogen purity in the raffinate or retentate stream at various stage cuts and the lowest percent stage cut at which a specific nitrogen purity can be attained with this cartridge. The data also shows the percent nitrogen recovered from the feed stream at a specific purity and stage cut. When operating under countercurrent flow mode in accord with this intention, nitrogen at a purity greater than 95 percent was readily obtained in the retentate component stream. However, when the unit was operated in a cocurrent flow mode, the maximum nitrogen purity obtainable in the retentate component stream did not exceed about 95 percent. The data in table I are consistent with theoretical operational performance for hollow fiber module construction with oxygen/nitrogen separation factor of 3.85 when operated under countercurrent/cocurrent flow conditions. Thus, the data shows that the module with bore side feed in countercurrent flow mode has essentially complete radial mixing of the permeate stream and essentially no axial mixing on either the permeate side or the raffinate side of the hollow fiber permeable membrane cartridge, and yields nitrogen of enhanced purity at lower stage cut and that nitrogen of higher purity could be obtained that can be obtained with cocurrent flow.

TABLE I

| Nitrogen Purity in Retentate % | Countercurrent Flow | | Cocurrent Flow | |
|---|---|---|---|---|
| | Stage Cut, % | Nitrogen Recovery, % | Stage Cut, % | Nitrogen Recovery, % |
| 90 | 42 | 66 | 48 | 59 |
| 92 | 50 | 52 | 60 | 47 |
| 94 | 58 | 50 | 74 | 31 |
| 95 | 62 | 46 | 85 | 18 |
| 96 | 67 | 40 | (a) | (a) |
| 97 | 71 | 36 | (a) | (a) |
| 98 | 78 | 27 | (a) | (a) |

(a)In cocurrent flow mode purity of nitrogen in retentate did not exceed 95 percent at any stage cut

Run B

For comparative purposes nitrogen separation was also evaluated under similar conditions using the cartridge having the straight parallel hollow fibers configuration. The fibers in the cartridge were evenly distributed and the packing density of the hollow fibers in the cartridge was analagous to the fiber packing density in the helically wound cartridge of this invention, slightly above 50 percent. The amount of nitrogen recovered at the same purity was considered significantly lower. This lower recovery being attributed not necessarily to the low level of radial mixing, but to the greater probability of channeling in parallel fiber arrangement module. This lower nitrogen recovery would be an economic disadvantage since it would require higher pressure and/or higher volume of feed and/or additional cartridge area to recover the same amount of nitrogen at a given purity during a given time period. This data is summarized in Table II. The data shows that in order to achieve the same nitrogen purity obtained with the helically wound hollow fiber permeable membrane cartridge employed in Run A, it was necessary to go to a higher stage cut, and that at the same purity lower nitrogen recovery was experienced.

TABLE II

| Nitrogen Purity in Retentate % | Countercurrent Flow | |
|---|---|---|
| | Stage Cut, % | Nitrogen Recovery, % |
| 90 | 44 | 64 |
| 92 | 52 | 50 |
| 94 | 61 | 46 |
| 95 | 65 | 42 |
| 96 | 70 | 36 |
| 97 | 74 | 32 |
| 98 | 81 | 24 |

EXAMPLE 2

The effect of the wind angle in the helically wound hollow fiber permeable membrane cartridge on the recovery of nitrogen from air was studied. For this purpose the three cartridges were used in which the wind angle was 17° (Run A), 25° (Run B) and 33° (Run C), these were heretofore described. The separations were conducted under conditions described above and each cartridge had a membrane area of about 35 square feet. The data, Table III, show that over the wide range of wind angles studied, wind angle has essentially no effect on air separation efficiency or purity of the nitrogen recovered. It was also noted that the angle of the wind appears to have little, if any, effect on module performance.

TABLE III

| Nitrogen Purity in Retentate % | Run A | | Run B | | Run C | |
|---|---|---|---|---|---|---|
| | Stage Cut, % | Nitrogen Recovery, % | Stage Cut, % | Nitrogen Recovery, % | Stage Cut, % | Nitrogen Recovery, % |
| 90 | 43 | 65 | 43 | 65 | 43 | 65 |
| 92 | 50 | 58 | 51 | 58 | 51 | 57 |
| 94 | 59 | 49 | 59 | 49 | 59 | 49 |
| 95 | 63 | 45 | 63 | 45 | 63 | 44 |
| 96 | 67 | 40 | 68 | 39 | 67 | 40 |
| 97 | 72 | 34 | 73 | 33 | 73 | 33 |
| 98 | 79 | 26 | 79 | 26 | 80 | 25 |

What is claimed is:

1. A gas separation process for the separation of at least one fast gas component from a feed gas mixture containing such fast gas component and at least one other gaseous component in a permeator module containing a helically wound hollow fiber cartridge, said process comprising:
   (a) passing the feed gas mixture to the permeator module so as to pass through the bores of the hollow fibers in said helically wound hollow fiber cartridge from a first feed end thereof, all of the hollow fibers in said permeable membrane cartridge being essentially of uniform length;
   (b) recovering said fast gas component that permeates the hollow fibers as a permeate stream on the outer, permeate side of said hollow fibers, said permeate stream being passed from the permeator module in a permeate flow direction that is countercurrent to the direction of the feed gas mixture flow within the bores of the hollow fibers; and
   (c) recovering a raffinate stream from the permeator module, said raffinate stream leaving the bores of the hollow fibers through a second, exit end thereof opposite the feed end thereof, said raffinate stream passing in a flow direction that is cocurrent to the direction of feed gas mixture flow within the bores of the hollow fibers, thereby maintaining (i) significant radial mixing of the permeate stream on the outer, permeate side of the hollow fiber permeable membrane cartridge and (ii) essentially no axial mixing on either (a) the outer permeate side or (b) in the bores of said hollow fiber permeable membrane cartridge.

2. A gas separation process as claimed in claim 1, wherein the lengths of the hollow fibers comprising the hollow fiber permeable membrane cartridge vary from one another by less than about 10%.

3. A gas separation process as claimed in claim 1, wherein the lengths of the hollow fibers comprising the hollow fiber permeable membrane cartridge vary from one another by less than about 5% to about 10%.

4. A gas separation process as claimed in claim 1, wherein said hollow fiber permeable membrane membrane is a composite membrane.

5. A gas separation process as claimed in claim 4, wherein said hollow fiber is coated polysulfone.

6. A gas separation process as claimed in claim 4, wherein said composite membranre is polysulfone hollow fiber coated with ethyl cellulose.

7. A gas separation process as claimed in claim 1, wherein the feed gas mixture is air.

8. A gas separation process as claimed in claim 1, wherein the feed gas is at essentially atmospheric pressure and the permeate is withdrawn under reduced atmospheric pressure.

9. A gas separation process as claimed in claim 1 wherein the feed gas mixture is passed to the permeator module at a pressure of from about 50 psig to about 400 psig.

10. A gas separation process for the separation of at least one fast gas component from a feed gas mixture containing said fast gas component and at least one other gaseous component in a permeator module containing a helically wound hollow fiber cartridge, said process comprising:
    (a) passing the feed gas mixture to the premeator module so as to pas through the bores of the hollow fibers in said helically wound hollow fiber cartridge from a first feed end thereof, all of the hollow fibers in said permeable membrane cartridge being essentially of uniform length;
    (b) recovering said fast gas component that permeates the hollow fibers as a permeate stream on the outer, permeate side of said hollow fibers, said permeate stream being passed from the permeator module in a permeate flow direction that is countercurrent to the direction of the feed gas mixture flow within the bores of the hollow fibers; and
    (c) recovering a raffinate stream from the permeator module, said raffinate stream leaving the bores of the hollow fibers through a second, exit end thereof opposite the feed end thereof, said raffinate stream passing in a flow direction that is cocurrent to the direction of feed gas mixture flow within the bores of the hollow fibers.

11. A gas separation process for the separation of at least one fast gas component from a feed gas mixture containing said fast gas component and at least one other gaseous component in a permeator module containing a helically wound hollow fiber cartridge, said process comprising:
    (a) passing the feed gas mixture to the permeator module so as to pass through the bores of the hollow fibers in said helically wound hollow fiber cartridge from a first feed end thereof, all of the hollow fibers in said permeable membrane cartridge being essentially of uniform length;
    (b) recovering said fast gas component that permeates the hollow fibers as a permeate stream on the outer, permeate side of said hollow fibers, said permeate stream being passed from the permeator module in a permeate flow direction that is countercurrent to the direction of the feed gas mixture flow within the bores of the hollow fibers; and
    (c) recovering a raffinate stream from the permeator module, said raffinate stream leaving the bores of the hollow fibers through a second, exit end thereof opposite the feed end thereof, said raffinate stream passing in a flow direction that is cocurrent to the direction of feed gas mixture flow within the bores of the hollow fibers, thereby maintaining essentially no axial mixing on either (a) the outer, permeate side or (b) in the bores of said hollow fiber permeable membrane cartridge.

* * * * *